United States Patent
Khachane et al.

(10) Patent No.: US 11,702,211 B2
(45) Date of Patent: Jul. 18, 2023

(54) HEADREST TILT MECHANISM UTILIZING GEAR REDUCTION

(71) Applicant: B/E Aerospace, Inc., Winston-Salem, NC (US)

(72) Inventors: Yashashree Umakant Khachane, Karnataka (IN); Pradeep Acharya, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 183 days.

(21) Appl. No.: 17/374,432

(22) Filed: Jul. 13, 2021

(65) Prior Publication Data
US 2022/0332426 A1     Oct. 20, 2022

(30) Foreign Application Priority Data
Apr. 15, 2021   (IN) .............................. 202141017580

(51) Int. Cl.
*B64D 11/06*      (2006.01)

(52) U.S. Cl.
CPC ...... *B64D 11/0642* (2014.12); *B64D 11/0689* (2013.01)

(58) Field of Classification Search
CPC ........ B60N 2/865; B60N 2/815; B60N 2/818; B60N 2/838; B60N 2/841; B60N 2/847; B60D 11/0642; B60D 11/0689
USPC ................................................ 297/408, 409
See application file for complete search history.

(56) References Cited

U.S. PATENT DOCUMENTS

| | | | |
|---|---|---|---|
| 534,582 A * | 2/1895 | Sargent | |
| 4,304,439 A * | 12/1981 | Terada | A47C 7/38 297/391 |
| 4,504,091 A * | 3/1985 | Ohshiro | B60N 2/2252 297/367 R |
| 4,570,510 A | 2/1986 | Babak | |
| 8,931,843 B2 | 1/2015 | Schüler et al. | |
| 8,974,000 B2 | 3/2015 | Navatte et al. | |
| 9,499,071 B2 * | 11/2016 | Karthaus | B60N 2/0232 |

(Continued)

FOREIGN PATENT DOCUMENTS

DE    102010035377 A1    2/2012
EP      0568776 B1       4/1997

(Continued)

OTHER PUBLICATIONS

Extended Search Report in European Application No. 21195337.7 dated Feb. 9, 2022, 10 pages.

*Primary Examiner* — Sarah B McPartlin
(74) *Attorney, Agent, or Firm* — Suiter Swantz pc llo

(57) ABSTRACT

A headrest assembly for a seat, such as an aircraft pilot seat, including a headrest and a headrest tilt mechanism. The tilt mechanism includes a headrest support, a casing fixed to the headrest support defining a rotation limiter feature determining a full aft headrest position and a full forward headrest position, a driven gear rotatably disposed in the casing, a driver gear rotatably disposed through an axial opening formed though the driven gear, an engaging feature for urging against the headrest, and an actuator for rotating the driver gear. The driven gear and the driver gear have a predetermined gear tooth reduction ratio and a predetermined axial shift distance such that the two gears are arranged in a profile shifted configuration.

20 Claims, 6 Drawing Sheets

(56) References Cited

U.S. PATENT DOCUMENTS

| | | |
|---|---|---|
| 9,695,699 B2 * | 7/2017 | Pernleitner ............... F01D 5/32 |
| 10,024,392 B2 | 7/2018 | Napau et al. |
| 10,093,200 B2 | 10/2018 | Dry |
| 2007/0013219 A1 * | 1/2007 | Chung ................... B60N 2/809 |
| | | 297/409 |
| 2009/0045661 A1 | 2/2009 | Stoessel et al. |
| 2014/0162827 A1 | 6/2014 | Wingensiefen |

FOREIGN PATENT DOCUMENTS

| | | | |
|---|---|---|---|
| GB | 1372808 | A | 11/1974 |
| GB | 2012570 | A | 8/1979 |
| JP | 3649843 | B2 | 5/2005 |
| KR | 100998335 | B1 | 12/2010 |

* cited by examiner

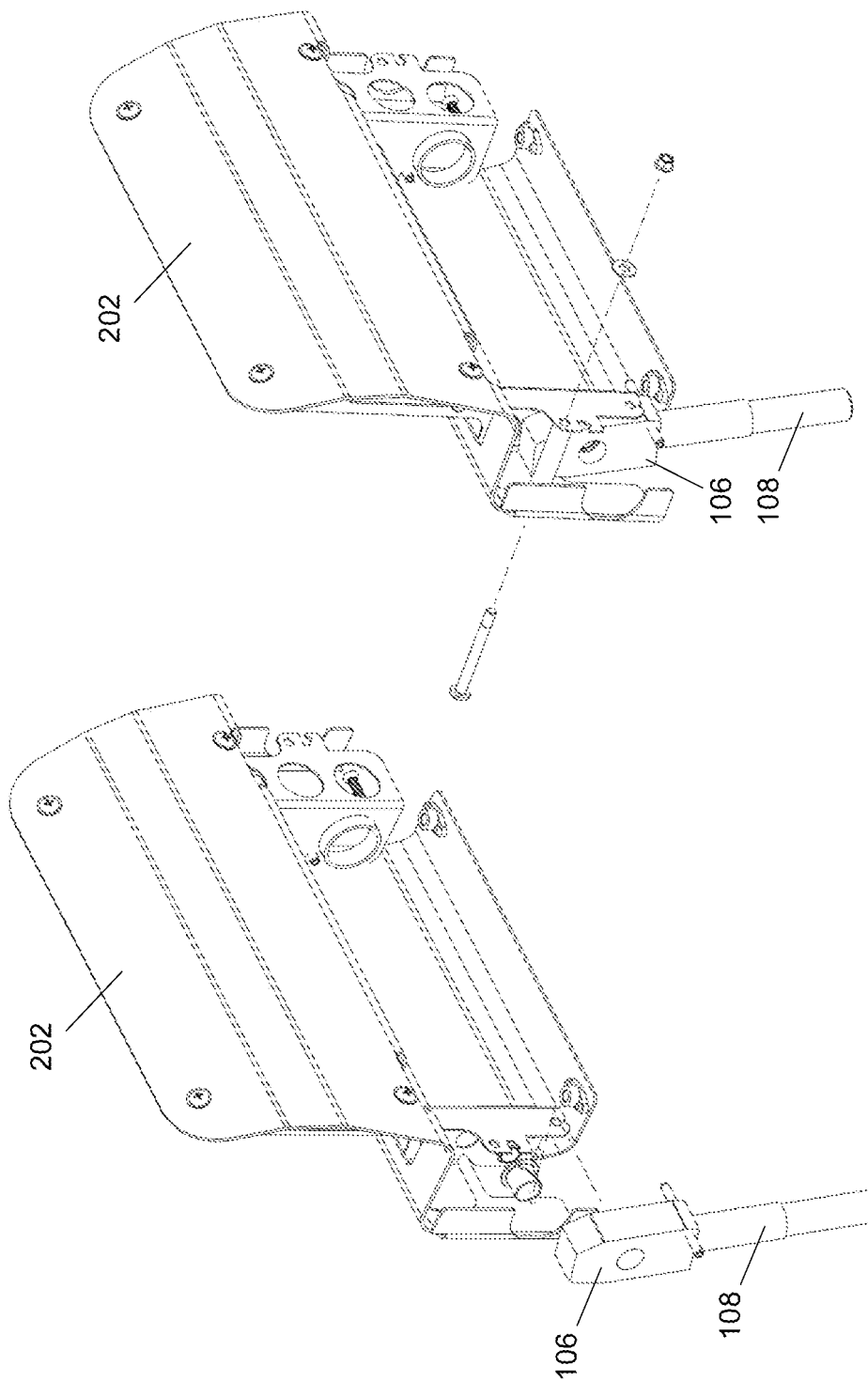

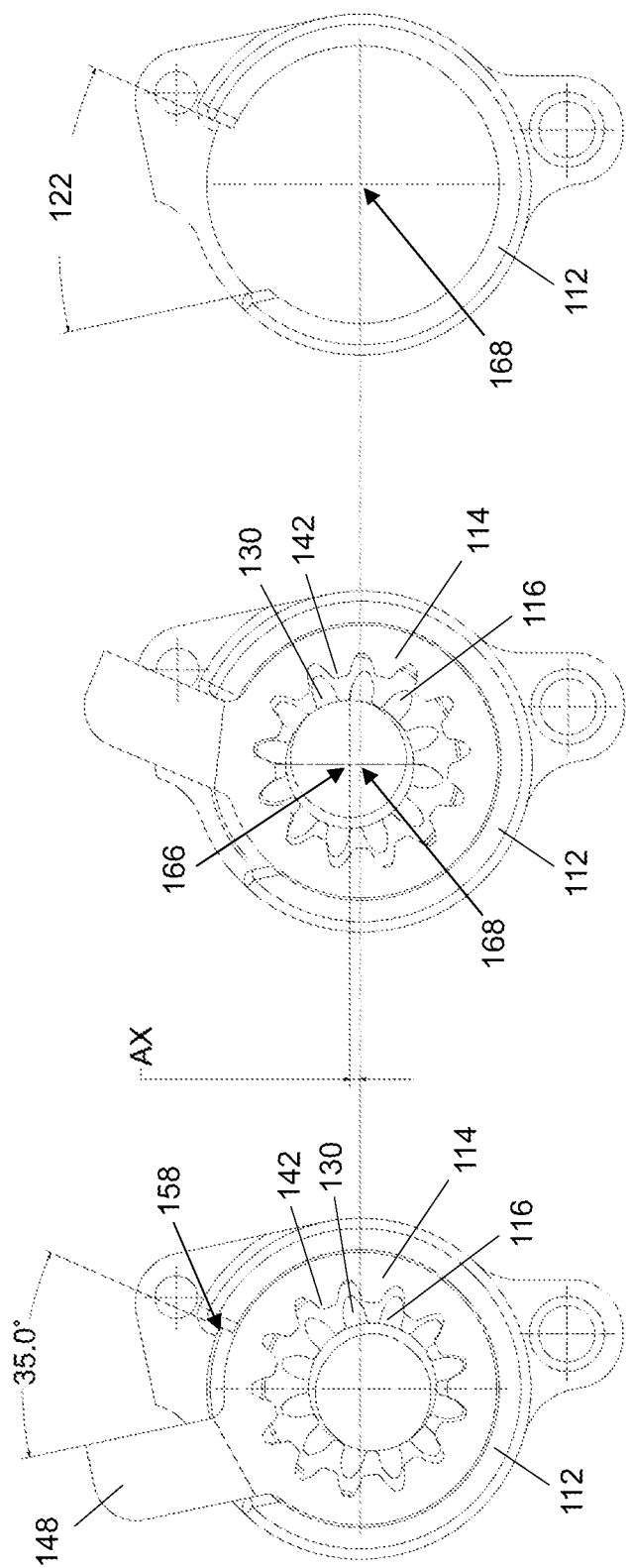

HEADREST TILT MECHANISM UTILIZING GEAR REDUCTION

BACKGROUND

Aircraft seats such as pilot seats are typically equipped with a headrest. To improve comfort for the pilot, the headrest can be equipped with an adjustment mechanism providing a predetermined range of forward and aft adjustment. To make the adjustment operation more intuitive, particularly when restricting the adjustment to a relatively small adjustment range, a harmonic reduction drive can be utilized.

Conventional headrest adjustment mechanisms utilizing harmonic reduction drives typically include a large number of parts. For example, conventional mechanisms typically include an actuator having a cam profile formed on an inside face that acts as a wave generator for the harmonic drive unit. Rollers housed in slots formed on a fixed inner gear of the device interface with the cam profile of the actuator. An outer gear of the device is generally a rigid member having gear teeth formed on the inside face thereof. As the actuator is rotated, the cam profile causes the rollers to move radially outward to engage with the outer gear, thereby causing the outer gear to rotate slowly subject to the reduction ratio of the device. Part count in such conventional mechanisms is typically high, and in some cases can exceed more than thirty total parts, thereby contributing to the cost, weight and complexity of these mechanisms. In general, complex mechanisms are more prone to failure and therefore are undesirable, particularly in aircraft applications.

Accordingly, what is needed is a headrest assembly for a seat, such as an aircraft pilot seat, equipped with a tilt mechanism having a reduced number of parts, reduced weight, and lower cost as compared to conventional headrest adjustment mechanisms utilizing harmonic drive devices.

BRIEF SUMMARY

In one aspect, embodiments of the inventive concepts disclosed herein are directed to a tilt adjustment mechanism for a headrest. The mechanism includes a headrest support attachable to a seat assembly component, a casing fixed to the headrest support and defining an interior annular space and a rotation limiter feature determining a full aft headrest position and a full forward headrest position, a driven gear rotatably disposed in the interior annular space, a driver gear rotatably disposed through an axial opening of the driven gear, a tab coupled to the driven gear adapted to interact with the rotation limiter feature and a headrest as the driven gear is driven, and a knob or other actuator type coupled to the driver gear for rotating the driver gear to thereby drive the driven gear. The driven gear has a greater number of gear teeth as compared to the driver gear and an axis of the driver gear is shifted relative to an axis of the driven gear by a predetermined distance to provide a profile shifted gear configuration to produce a large reduction in one step.

In some embodiments, the gear tooth number difference between the predetermined number of gear teeth of the driven gear and the predetermined number of gear teeth of the driver gear may be 1.

In some embodiments, the headrest support may include a main body, an opening formed in the main body interacting with the first end of the driver gear, and a post extending from one end of the main body, the post attachable to or receivable in a seat element, for instance a seat back.

In some embodiments, the headrest support may further include an elongate support member extending from a side of the main body opposite the casing on which a headrest is pivotally mountable.

In some embodiments, the rotation limiter feature may be a slot formed along an outer circumferential portion of the casing, the slot having a first end corresponding to the full aft headrest position and a second end corresponding to the full forward headrest position, wherein the tab extends through the slot and travels within the slot to urge against or move away from a headrest to change the tilt of the headrest to achieve the full aft headrest position or the full forward headrest position or any headrest position therebetween.

In some embodiments, the headrest tilt mechanism may further include a biasing mechanism operable for biasing the headrest toward the full aft headrest position, the biasing mechanism including a biasing member having a first end coupled to the headrest support and a second end adapted to be coupled to a headrest component.

In some embodiments, the driven gear may have thirteen gear teeth and the driver gear may have twelve gear teeth.

In some embodiments, the driven gear may define an annular flange, the casing may define an annular collar, and the annular collar may engage the annular flange to maintain the driven gear and the driver gear in a captured state between the casing and the headrest support.

In some embodiments, the second end of the driver gear may be externally threaded, the knob may be internally threaded, and the knob may threadably engage the second end of the driver gear.

In another aspect, embodiments of the inventive concepts disclosed herein are directed to a headrest assembly including the headrest tilt mechanism and a headrest pivotally coupled to the elongate support of the headrest support, wherein the tab urges against a portion of the headrest to drive headrest tilt toward the full forward headrest position as the driver gear is rotated in a first direction, and wherein the tab moves in a direction away from the portion of the headrest as the driver gear is rotated in a second direction, opposite the first direction, to allow the headrest to move toward the full aft headrest position, for instance under the force of a biasing return mechanism.

In some embodiments, the angular range of headrest tilt adjustment between the full aft position and the full forward position may be approximately 35 degrees.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4A illustrates a perspective view of a disassembled side of the headrest assembly positioned opposite the headrest tilt mechanism, FIG. 4B illustrates a perspective view a partially assembled side of the headrest assembly positioned opposite the headrest tilt mechanism;

FIG. 6A illustrates a side view of the headrest tilt mechanism drive assembly showing a full aft position of the headrest and a predetermined angular range of headrest tilt adjustment;

FIG. 6B illustrates a side view of the drive mechanism showing the axis shift distance of the driver gear relative to the driven gear, and the gear tooth difference, producing a large reduction ratio in one set; and FIG. 6C illustrates a side view of the casing and opening on the casing determining the predetermined and achievable headrest tilt angular range.

DETAILED DESCRIPTION

Figure 1:
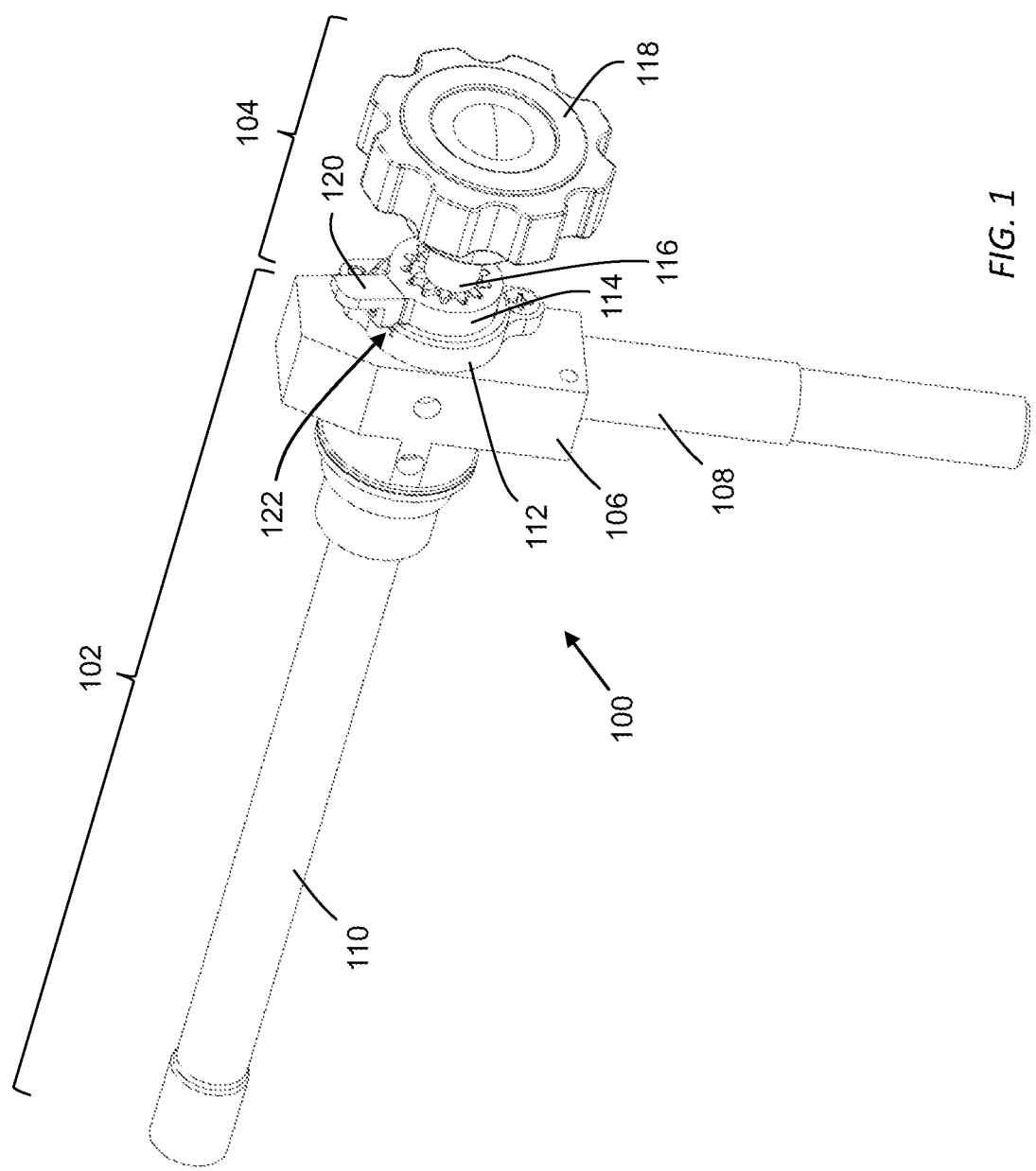
FIG. 1 illustrates a perspective view of an assembled headrest tilt mechanism according to the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to a headrest tilt mechanism and a headrest assembly including a headrest tilt mechanism. The mechanism and the assembly may be utilized to equip a seat, such as a passenger seat, and in particular an aircraft pilot seat, with an adjustable headrest. The headrest tilt mechanism and the headrest assembly equipped with the headrest tilt mechanism are compatible for use with other seat adjustment mechanisms, for instance seat back recline mechanisms, headrest vertical adjustment mechanisms, and headrest forward and aft translation mechanisms. Benefits of the embodiments described herein include improved comfort for the seat occupant and a mechanism and assembly package having a reduced part count, light weight, ease of use, and improved reliability.

FIG. 1 illustrates a perspective view of an assembled headrest tilt mechanism 100 according to an embodiment of the present disclosure. The headrest tilt mechanism 100 generally includes a headrest support assembly 102 and a drive unit 104 operating on the principle of gear tooth reduction and profile shifted internal and external gears. The headrest support assembly 102, also referred to herein as the headrest support, generally functions to support a headrest assembly coupled to a seat assembly component through the headrest support. In some embodiments, the headrest support may be coupled to a seat back or to a headrest vertical adjustment mechanism provided in the seat back. The drive unit 104 generally functions to adjust the headrest position by controlling tilt between a full aft headrest position and a full forward headrest position. As discussed further below, the headrest tilt mechanism 100 determines an angular range of motion of the headrest and the drive unit acts on the headrest to change the headrest angle to position the headrest in the full aft headrest position, the full forward headrest position, or any headrest position therebetween.

The headrest support 102 generally includes at least one main body 106 having a post 108 extending from one end of the main body and an elongate support 110 extending from one side of the main body. In some embodiments, the post 108 and the elongate support are perpendicular. The post 108 may be a tubular member adapted to be received in a barrel provided in a seat back. The elongate support 110 may also be a tubular member supporting a headrest assembly pivotally mounted to the headrest support 102, as discussed further below.

The drive unit 104 mounts to one side of the main body 106, opposite the elongate support 110, and generally includes a casing 112 containing and constraining rotational motion of a driven gear 114 and a driver gear 116 provided in a profile shifted configuration. A knob 118 affixed to one end of the driver gear 116 functions as a manual actuator to turn or rotate the driver gear 116 to thereby turn or rotate the driven gear 114. The driven gear 114 carries an engaging feature 120 that acts on a headrest pivotally coupled to the headrest support 102, The engaging feature 120 travels along a length of a rotation limiter feature 122 defined by the casing. The rotation limiter feature 122 determines the full aft headrest position, the full forward headrest position, and the total angular range of headrest tilt adjustment. Turning the knob 118 in a first direction (e.g., clockwise) turns the driver gear 116 thereby turning the driven gear 114 (e.g., clockwise) causing the engaging feature 120 to travel 'forward' within or relative to the rotation limiter feature 122. Turning the knob 118 in a second direction (e.g., counterclockwise), opposite the first direction, turns the driver gear 116 thereby turning the driven gear 114 (e.g., counterclockwise) causing the engaging feature 120 to travel 'aft' within or relative to the rotation limiter feature 122.

Figure 2:
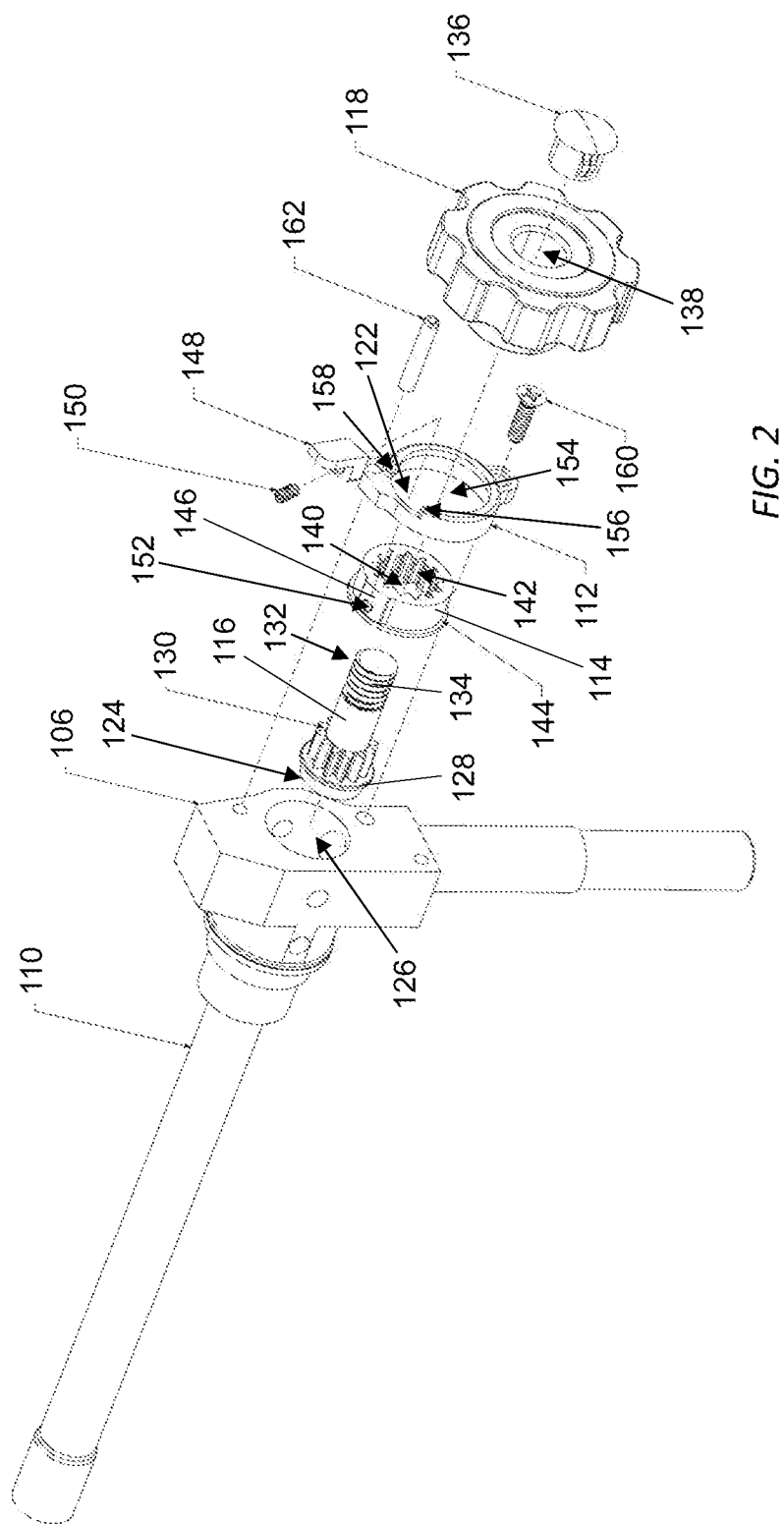
FIG. 2 illustrates an exploded view of the headrest tilt mechanism shown in FIG. 1.

Referring to FIG. 2, the driver gear 116 has a first end 124 received in an opening 126 formed in one side or face of the main body 106. An annular shoulder 128 defined on the driver gear 116 axially inward of the first end 124 positions within the opening 126 and is constrained between the main body 106 and one side of the driven gear 114 in the assembled state of the headrest tilt mechanism 100. A predetermined number of gear teeth 130 are formed along an outer circumferential surface of the driver gear 116 axially inward of the annular shoulder 128. A second end 132 of the driver gear 116 positioned opposite the first end 124 is externally threaded 134 in order to threadably engage internal threading formed on the knob 118 to secure the knob to the second end 132 of the driver gear such that turning the knob turns the driver gear. A plug 136 closes an opening 138 formed axially through the knob 118.

The driven gear 114 defines an axial opening 140 and a predetermined number of gear teeth 142 are formed on an inner circumferential surface of the driven gear. An annular flange 144 formed on one end of the driven gear 114 engages the side of the main body and the annular shoulder 128 to maintain the first end 124 of the driver gear 116 in the opening 126 formed on the main body 106. A plateau 146 formed along the outer circumferential surface of the driven gear 114 serves as a mounting location for the engaging feature, for instance a tab 148. As used herein, the tab 148 represents one exemplary implementation of the engaging feature and is not intended to limit the engaging feature to any particular structure or geometry. In other words, the term 'tab' as used herein denotes any physical structure that acts on or interacts with headrest assembly structure to drive headrest tilt. A grub screw 150 received through the tab 148 threadably engages in a threaded opening 152 formed in the surface of the driven gear 114.

The casing 112 defines an axial opening forming an interior annular space 154 receiving a portion of the driven gear 114 and the driver gear 116 through the axial opening 140 of the driven gear 114. The rotation limiter feature 122 is formed along a circumferential surface portion of the casing 112. In some embodiments, and as shown, the rotation limiter feature 122 may be implemented as an elongate slot or break formed in the outer circumferential surface. A first slot end 156 corresponds to the full aft headrest position. A second slot end 158 corresponds to the full forward headrest position. In the assembled state of the headrest tilt mechanism 100, the tab 148 extends from the driven gear 114 through the rotation limiter feature 122 and radially outward beyond the casing 112 to engage a headrest component as discussed further below. The tab 148 is configured to travel along the length of the rotation limiter feature 122 as the driven gear 114 is driven by knob rotation. Contact between the tab 148 and the first slot end 156 positions the headrest in the full aft headrest position. Contact between the tab 148 and the second slot end 158 positions the headrest in the full forward headrest position. The casing 112 may be affixed to the main body 106 using at least one threaded fastener 160. A pin 162 received through the casing 112 and into the main body 106 further affixes the casing to the main body and may serve to mount a portion of the biasing mechanism as discussed further below.

Figure 3B:
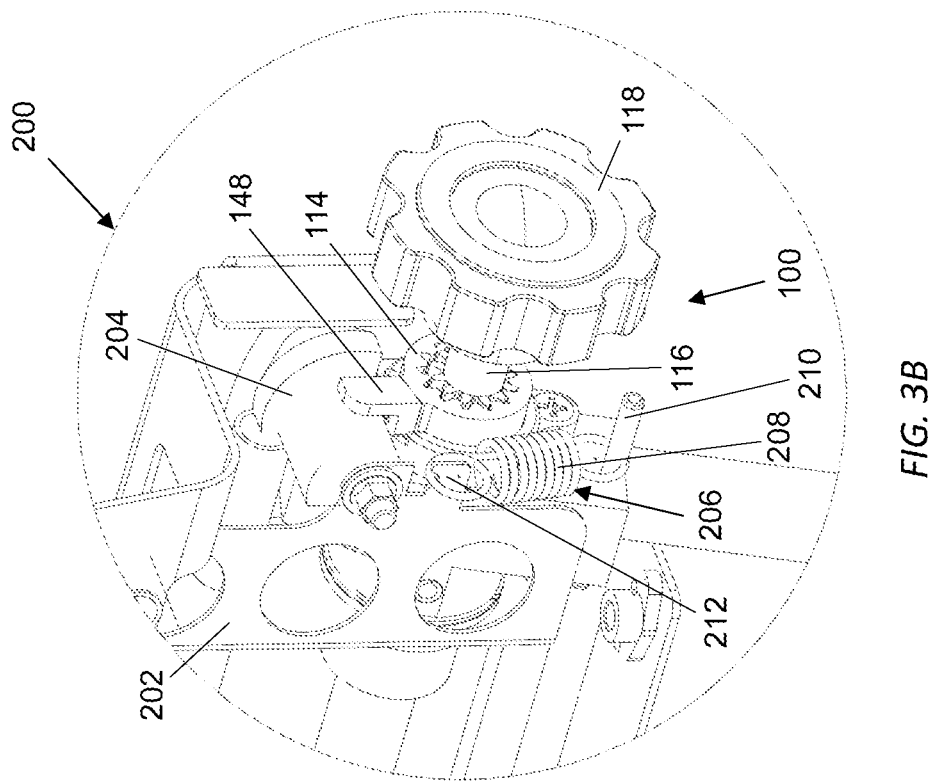
FIG. 3B illustrates a detailed view of the headrest tilt mechanism of FIG. 3A.
Figure 3A:
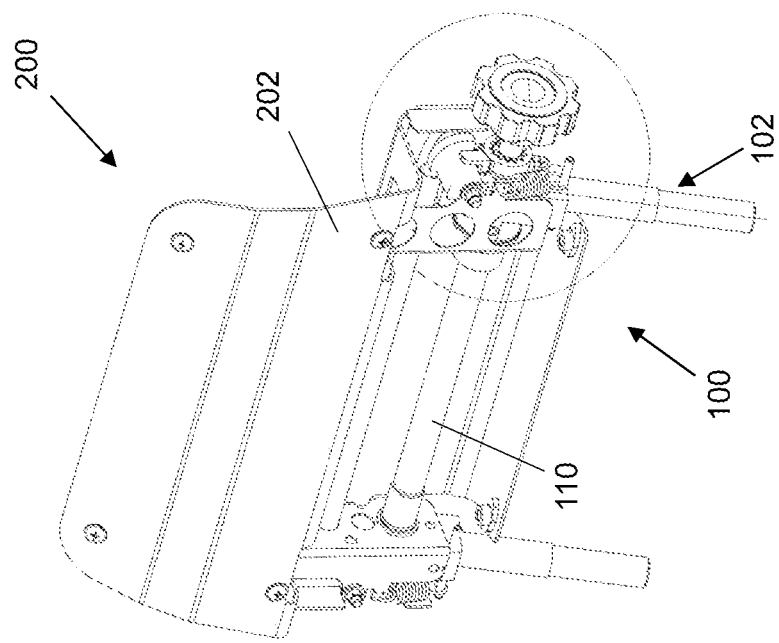
FIG. 3A illustrates a perspective view of a headrest assembly for a seat, such as an aircraft pilot seat, equipped with a headrest tilt mechanism according to the present disclosure.

With reference to FIGS. 3A and 3B, a headrest assembly 200 according to an embodiment of the present disclosure generally includes a headrest 202 and the headrest tilt mechanism 100 discussed above. The headrest 202 is pivotally coupled to the headrest support 102, for instance pivotally coupled to the elongate support 110. In some embodiments, the headrest 202 may include a plurality of frame members on which may be mounted at least one cushion. The headrest 202 may be upholstered. The headrest tilt mechanism 100 is positioned on one side of the headrest 202 such that the knob 118 is accessible along one side of the headrest. A majority of the headrest tilt mechanism 100, with the exception of the knob 118, may be concealed beneath the headrest cover.

In use, the tab 148 urges against a headrest component 204 to drive the headrest 202 toward the full forward headrest position as the driver gear 116 is caused to rotate in a first direction, and the tab 148 moves in a direction away from the headrest component 204 as the driver gear 116 is rotated in a second direction, opposite the first direction, to allow the headrest 202 to move toward the full aft headrest position by force from a biasing mechanism 206. In some embodiments, the biasing mechanism 206 includes a tension spring 208 positioned on each opposing side of the headrest assembly 200 in a symmetrical arrangement. One end of each tension spring 208 is coupled to a fixed component of the headrest support 102 and the opposing end of each tension spring 208 is coupled to a headrest component. As shown, each tension spring 208 may be affixed at one end to a pin 210 of the headrest support 102 and at an opposing end to a catch 212 provided on the headrest 202 such that headrest movement toward the full forward position energizes the tension springs thereby biasing the headrest 202 toward the full aft position. In an alternative embodiment, the tab 148 may be coupled to the headrest 202 such that turning the knob in one direction pushes the headrest while turning the knob in the opposite direction pulls the headrest along with the tab. Other biasing members and configurations for biasing the headrest in a predetermined direction are envisioned.

With reference to FIGS. 4A and 4B, the headrest side opposite the headrest tilt mechanism may be supported by a similar main body 106 and post 108 provided in a symmetrical arrangement, with the main body 106 pivotally attached to the headrest 202 to permit the headrest to pivot forward relative to the main body under the force of the tab and pivot aft relative to the main body under the force of the tension springs or other biasing members.

Figure 5B:
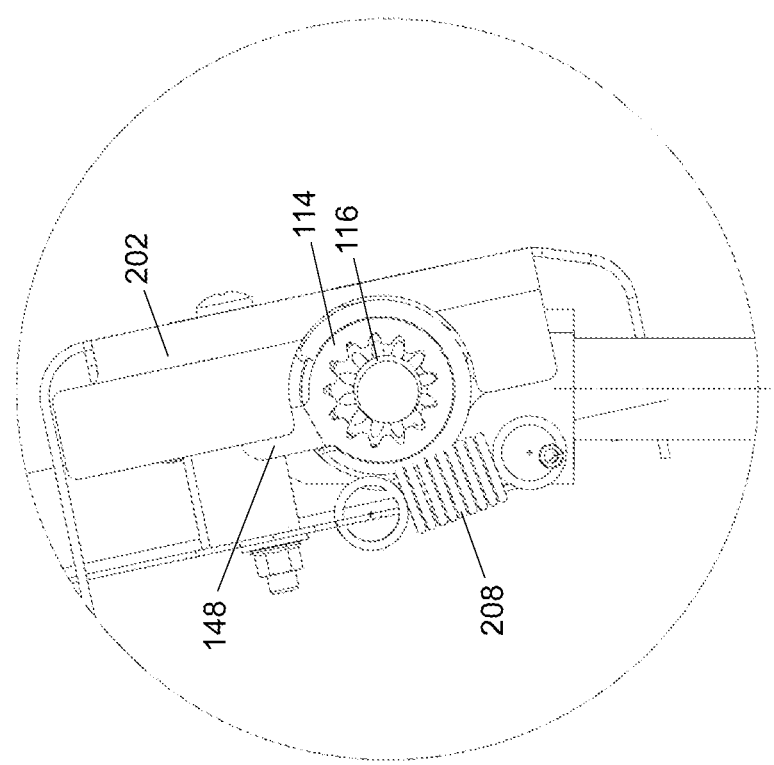
FIG. 5B illustrates a detailed view of the biasing mechanism of FIG. 5A for returning the headrest to the full aft headrest position.
Figure 5A:
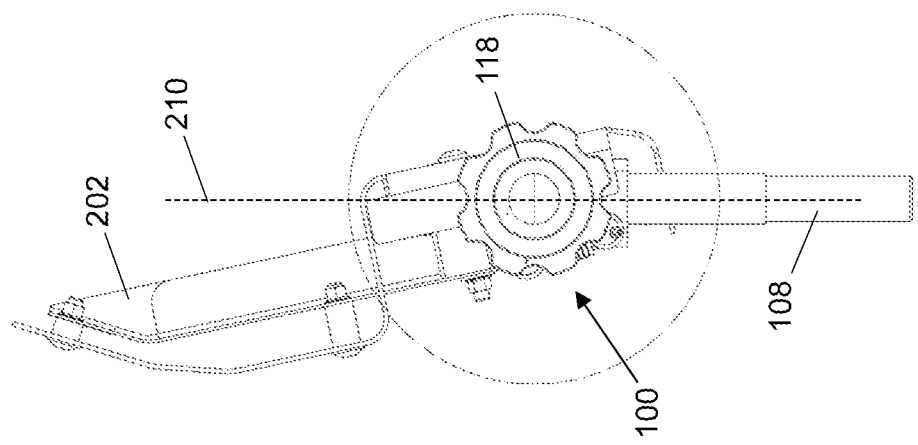
FIG. 5A illustrates a side view of a headrest assembly equipped with a headrest tilt mechanism according to an embodiment of the present disclosure.

With reference to FIGS. 5A and 5B, the posts 108 are adapted to be received in a seat component, for instance a seat back. In a non-limiting example, a full aft headrest position may be aft of vertical 210 whereas a full forward headrest position may be forward of vertical 210. The headrest tilt mechanism 100 packages compactly on one side of the headrest 202 and the knob 118 extends outward beyond the one headrest side accessible to be grasped by the seat occupant. In an alternative embodiment, the manual knob may be replaced with an actuator to provide automated tilt adjustment. With specific reference to FIG. 5B, the tab 148 is shown in physical contact with the headrest and in the full aft headrest position such that rotating the driver gear 116 clockwise drives the driven gear 114 clockwise and consequently the tab 148 'forward' to pivot the headrest 202 toward the full forward position. Upon turning the knob 118 counterclockwise, the spring force stored in the tension springs 208 causes the headrest 202 to follow the retreating tab 148.

With reference to FIGS. 6A-6C, the slot length of the rotation limiter feature 122 can be customized to determine the angular range of headrest tilt. The circumferential position of the rotation limiter feature 122 can also be customized to determine the headrest angle in each of the full aft headrest position and the full forward headrest position. As shown in FIG. 6A, in a non-limiting example, the full range of headrest tilt adjustment may be 35 degrees as measured from the forward face of the tab 148 to the second slot end 158. Other angular ranges are possible and are envisioned.

The configuration of the driver gear 116 and the driven gear 114 is a reduced gear tooth ratio and profile shifted configuration such that rotating the driver gear 116 causes a lesser rotation (i.e., very small) in the driven gear 114 for fine headrest tilt adjustment. In some embodiments, the gear tooth difference may be 1 gear tooth with the driven gear 114 including a greater number of gear teeth as compared to the driver gear 116. In a non-limiting example, and as shown, the driven gear 114 includes thirteen gear teeth 142 whereas the driver gear 116 includes twelve gear teeth 130. Such a reduced gear tooth ratio causes the driven gear 114 to rotate by a distance equal to one gear tooth. In addition, whereas the casing 112 and the driven gear 114 are axially aligned along a center axis of the tilt mechanism, the driver gear axis 166 is shifted relative to the driven gear axis 168 (i.e., the center axis) by a distance AX thereby providing a profile shifted internal/external gear arrangement. As such, each time the driver gear 116 makes a full rotation, the driver gear 116 skips one gear tooth on the driven gear 114, thereby producing a large reduction ratio in one step (e.g., 1/13).

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A headrest tilt mechanism, comprising:
    a headrest support attachable to a seat assembly component;
    a casing fixed to the headrest support, the casing defining an interior annular space and a rotation limiter feature, a first portion of the rotation limiter feature determining a full aft headrest position and a second portion of the rotation limiter feature determining a full forward headrest position;
    a driven gear having a portion rotatably disposed in the interior annular space of the casing, the driven gear having an axial opening and a predetermined number of gear teeth formed on an inner circumferential surface thereof;
    a driver gear rotatably disposed through the axial opening of the driven gear, the driver gear having a first end interacting with the headrest support and a second end extending outward beyond the casing, and the driver gear having a predetermined number of gear teeth formed on an outer circumferential surface thereof meshed with the predetermined number of gear teeth of the driven gear in a profile shifted configuration;
    a tab coupled to the driven gear, the tab interacting with the rotation limiter feature as the driven gear is driven to control a headrest position between the full aft headrest position and the full forward headrest position; and
    a knob coupled to the second end of the driver gear for rotating the driver gear to drive the driven gear;
    wherein the driven gear has a greater number of gear teeth than the driver gear; and
    wherein an axis of the driver gear is shifted relative to an axis of the driven gear by a predetermined distance.

2. The headrest tilt mechanism according to claim 1, wherein a gear tooth number difference between the predetermined number of gear teeth of the driven gear and the predetermined number of gear teeth of the driver gear is 1.

3. The headrest tilt mechanism according to claim 1, wherein the headrest support comprises a main body, an opening formed in the main body interacting with the first end of the driver gear, and a post extending from one end of the main body.

4. The headrest tilt mechanism according to claim 3, further comprising an elongate support member extending from a side of the main body opposite the casing.

5. The headrest tilt mechanism according to claim 1, wherein the rotation limiter feature is a slot formed along an outer circumferential portion of the casing, the slot having a first end corresponding to the full aft headrest position and a second end corresponding to the full forward headrest position, wherein the tab extends through the slot and travels within the slot to urge against or move away from a headrest to move the headrest between the full aft headrest position and the full forward headrest position.

6. The headrest tilt mechanism according to claim 1, further comprising a biasing mechanism operable for biasing a headrest toward the full aft headrest position, the biasing mechanism including a biasing member having a first end coupled to the headrest support and a second end adapted to be coupled to a headrest component.

7. The headrest tilt mechanism according to claim 1, wherein the driven gear has thirteen gear teeth and the driver gear has twelve gear teeth.

8. The headrest tilt mechanism according to claim 1, wherein the driven gear defines an annular flange, the casing defines an annular collar, and the annular collar engages the annular flange to maintain the driven gear and the driver gear in a captured state between the casing and the headrest support.

9. The headrest tilt mechanism according to claim 1, wherein the second end of the driver gear is externally threaded, the knob is internally threaded, and the knob threadably engages the second end of the driver gear.

10. A headrest assembly, comprising:
    a headrest tilt mechanism, comprising:
        a headrest support attachable to a seat assembly component, the headrest support including a main body defining an opening, a post extending from one end of the opening, and an elongate support extending from one side of the main body;

a casing fixed to the headrest support, the casing defining an interior annular space and a rotation limiter feature, a first portion of the rotation limiter feature determining a full aft headrest position and a second portion of the rotation limiter feature determining a full forward headrest position;

a driven gear having a portion rotatably disposed in the interior annular space of the casing, the driven gear having an axial opening and a predetermined number of gear teeth formed on an inner circumferential surface thereof;

a driver gear rotatably disposed through the axial opening of the driven gear, the driver gear having a first end interacting with the opening of the headrest support and a second end extending outward beyond the casing, and the driver gear having a predetermined number of gear teeth formed on an outer circumferential surface thereof meshed with the predetermined number of gear teeth of the driven gear in a profile shifted configuration;

a tab coupled to the driven gear, the tab interacting with the rotation limiter feature as the driven gear is driven to control a headrest position between the full aft headrest position and the full forward headrest position; and a knob coupled to the second end of the driver gear for rotating the driver gear to drive the driven gear;

wherein the driven gear has a greater number of gear teeth than the driver gear; and wherein an axis of the driver gear is shifted relative to an axis of the driven gear by a predetermined distance; and a headrest pivotally coupled to the elongate support of the headrest support, wherein the tab urges against a portion of the headrest to drive the headrest toward the full forward headrest position as the driver gear is rotated in a first direction, and wherein the tab moves in a direction away from the portion of the headrest as the driver gear is rotated in a second direction, opposite the first direction, to allow the headrest to move toward the full aft headrest position.

11. The headrest assembly according to claim 10, wherein a gear tooth number difference between the predetermined number of gear teeth of the driven gear and the predetermined number of gear teeth of the driver gear is 1.

12. The headrest assembly according to claim 10, wherein the rotation limiter feature is a slot formed along an outer circumferential portion of the casing, the slot having a first end corresponding to the full aft headrest position and a second end corresponding to the full forward headrest position, wherein the tab extends through the slot and travels within the slot between the full aft headrest position and the full forward headrest position.

13. The headrest assembly according to claim 10, further comprising a biasing mechanism operable for biasing the headrest toward the full aft headrest position, the biasing mechanism including a biasing member having a first end coupled to the headrest support and a second end coupled to the headrest.

14. The headrest assembly according to claim 10, wherein the driven gear has 13 gear teeth and the driver gear has 12 gear teeth.

15. The headrest assembly according to claim 10, wherein the driven gear comprises an annular flange, the casing comprises an annular collar, and the annular collar engages the annular flange to maintain the driven gear and the driver gear in a captured state between the casing and the headrest support.

16. The headrest assembly according to claim 10, wherein the second end of the driver gear comprises external threading, the knob comprises internal threading, and the knob threadably engages the second end of the driver gear.

17. The headrest assembly according to claim 10, further comprising a plug received in an axial opening defined through the knob.

18. The headrest assembly according to claim 10, wherein the range of headrest tilt adjustment between the full aft position and the full forward position is approximately 35 degrees.

19. A headrest assembly, comprising:
a headrest tilt mechanism, comprising:
a headrest support;
a casing fixed to the headrest support, the casing defining a rotation limiter feature determining a full aft headrest position and a full forward headrest position;
a driven gear rotatably disposed in the casing;
a driver gear rotatably disposed through an axial opening formed though the driven gear;
an engaging feature coupled to the driven gear for interacting with the rotation limiter feature as the driven gear is driven to control a headrest position between the full aft headrest position and the full forward headrest position; and
an actuator for rotating the driver gear to rotate the driven gear;
wherein the driven gear has a greater number of gear teeth than the driver gear; and
wherein an axis of the driver gear is shifted relative to an axis of the driven gear by a predetermined distance; and
a headrest pivotally coupled to the headrest support, wherein the engaging feature urges against the headrest to drive the headrest toward the full forward headrest position as the driver gear is rotated in a first direction, and wherein the engaging feature moves in a direction away from the headrest as the driver gear is rotated in a second direction, opposite the first direction, to allow the headrest to move toward the full aft headrest position.

20. The headrest assembly according to claim 19, further comprising a biasing mechanism operable for biasing the headrest toward the full aft headrest position, the biasing mechanism including a biasing member having a first end coupled to the headrest support and a second end coupled to the headrest.

* * * * *